United States Patent Office 3,379,715
Patented Apr. 23, 1968

3,379,715
MONOAZO PYRAZOLONE DYESTUFFS
Max E. Chiddix and Harlan B. Freyermuth, Easton, Pa., assignors to General Aniline & Film Corporation, New York, N.Y., a corporation of Delaware
No Drawing. Filed Dec. 30, 1964, Ser. No. 422,397
6 Claims. (Cl. 260—163)

This invention relates to a novel fiber-coloring process and to a novel group of chromophoric compounds or dyestuffs useful in such process.

A number of dyeing processes are known in which dyeings of improved fastness properties are obtained by reaction between the dyestuff and the fiber. Among the large number of types of fiber-reactive dyestuffs proposed for use in such processes, only a few are commercially available. Among these are the dyestuffs of the sulfatoethylsulfone or sulfatoethyliminosulfone type. Because of the relative scarcity of such dyestuffs and/or their substantial unavailability to large sections of the dyeing trade and/or various disadvantages inherent in their production or use with respect to procedure, cost, and/or results obtained, there exists a definite need in the industry for new and improved types of reactive dyestuffs and/or methods of using the same.

One of the principal disadvantages attributable to fiber-reactive dyestuffs of the above mentioned type resides in the difficulty of attainment of adequate solubility both to facilitate application of the dyestuff to the fiber with which it is to be reacted and to aid in the removal of any dyestuff which has not reacted with the fiber by washing. While these dyestuffs have reasonably good solubility characteristics by reason of the sulfato ester groups therein, under the conditions suitable for carrying out the desired reaction between the dyestuff and the fiber, subsequent decomposition and hydrolysis of these fiber-reactive ester groups take place. Those dyestuff molecules which have not reacted with the fiber are accordingly no longer water soluble by reason of the removal of the ester groups therefrom and are therefore not readily removed from the dyed fiber by washing. On the other hand they are not sufficiently well bonded to the fiber to avoid the serious handicap of poor crock fastness. In addition such loosely held dyestuff contributes greatly to the likelihood of dullness and irregularity of application resulting from possible crystallization on or within the fiber. While the obvious expedient of sulfonation of the fundamental dyestuff molecule has been resorted to in order to impart improved solubility including the necessary solubility to permit removal of unreacted dyestuff from the dyed fiber by washing, such expedient usually results in a change of shade and, in some cases, increased dullness. In addition, sulfonate groups in the resulting dyeings have presented some difficulties during repeated washing in soft water since the metal ion of the sulfonate group is replaced by a hydrogen ion and the resulting strongly acidic sulfonic acid group causes tendering of the cloth.

It is an object of this invention to provide a novel group of water soluble organic fiber-reactive dyestuffs which will not be subject to one or more of the above disadvantages. Another object of this invention is the provision of a process for coloring fibers with such dyestuffs. Other objects and advantages will appear as the description proceeds.

The attainment of the above objects is made possible by this invention which is based upon the discovery and provision of an organic dyestuff devoid of nuclearly substituted sulfonic and carboxylic acid groups and having the formula

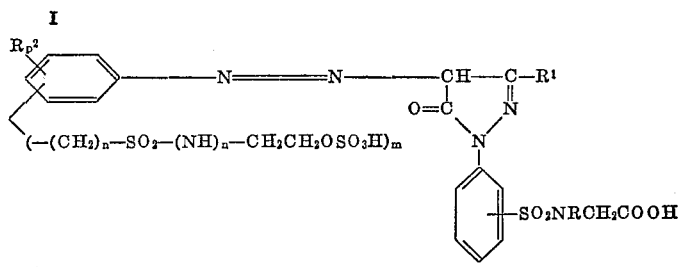

wherein R is selected from the group consisting of H, lower alkyl, and —CH$_2$COOH; R$^1$ is selected from the group consisting of lower alkyl and —COOH; R$^2$ is selected from the group consisting of H, lower alkyl, lower alkoxy, and halogen; $n$ has a value of 0 or 1; $m$ is an integer of 1 to 2; and $p$ has a value of 0 to 2.

In the above formula, lower alkyl is exemplified by methyl and ethyl, lower alkoxy is exemplified by methoxy and ethoxy, and halogen is exemplified by fluorine, iodine, bromine, and chlorine. The left hand benzene diazo component contains 1 or 2 ($m$) fiber-reactive groups as depicted, and the right hand phenyl pyrazolone coupling component contains the nuclearly substituted water-solubilizing sulfoneamidoacetic acid group of the invention. It will be understood that the values for the two depicted $n$ terms may be the same or different, that phosphato groups may be substituted for the depicted sulfato groups in the fiber-reactive radicals of the diazo component, that other aromatic primary amines may be employed as diazo components, such as naphthylamines, diphenylamines, diphenyletheramines, diphenylketoneamines, aminoazo dyestuffs, and the like containing one or more of the depicted fiber-reactive radicals, and that the free acid forms of the carboxylic and sulfato groups are to be considered equivalent to their salt forms wherein the H atom in these groups may be replaced by a metal ion including alkali metal and alkaline earth metal such as sodium, potassium, lithium, calcium, magnesium, and the like, ammonium, or organic amine cations. It will also be understood that one or more of the C-bonded hydrogen atoms in the compounds of the above formula may be replaced by inert substituents including lower alkyl such as methyl and ethyl, cycloalkyl such as cyclohexyl, and aryl such as phenyl and naphthyl groups.

It has been found that dyestuffs of the above formula are readily and economically manufactured, relatively speaking, and are readily applied to fibers containing a reactive or labile hydrogen atom from an aqueous medium under acid binding conditions by dyeing or printing for the production of dyeings and prints having improved fastness properties including resistance to wet treatments and resistance to crocking. Although the invention includes dyestuffs containing 1 or 2 of the above defined fiber-reactive radicals, further improved fiber-reactivity, fastness properties, and solubility properties are attained when the dyestuffs contain 2 of these radicals. Optimally the two fiber-reactive groups are substituted in the the benzene ring in meta position relative to each other, whereby increased fiber-reactivity and/or cross linking affects are attained, the reactivity being apparently increased by this manner of substitution in a single nucleus. In general, increased fastness properties, apparently by a cross linking mechanism are attained when the dyestuffs of the invention contain a plurality of such fiber-reactive radicals.

The combination of carboxylic acid and sulfate ester groups in the dyestuffs of the present invention results in excellent solubility characteristics facilitating their application to the fiber by padding, printing and other procedures. Since the fiber-reactive sulfate ester groups are removed during the dyeing or printing operation, only the weekly acidic carboxylic radical of the water-solubilizing group remains in the dyeing which does not tender the fiber upon repeated washing in soft water. It is believed that the highly advantageous solubility properties of these dyestuffs are related to the pK of the depicted aliphatically bound carboxylic acid radical in the water-solubilizing group.

The water-solubilizing group in the phenyl ring of the phenylpyrazolone coupling component may be in ortho, meta or para position. These pyrazolone coupling components employed in making the azo dyestuffs of the present invention are variously synthesized by the following 3 procedures:

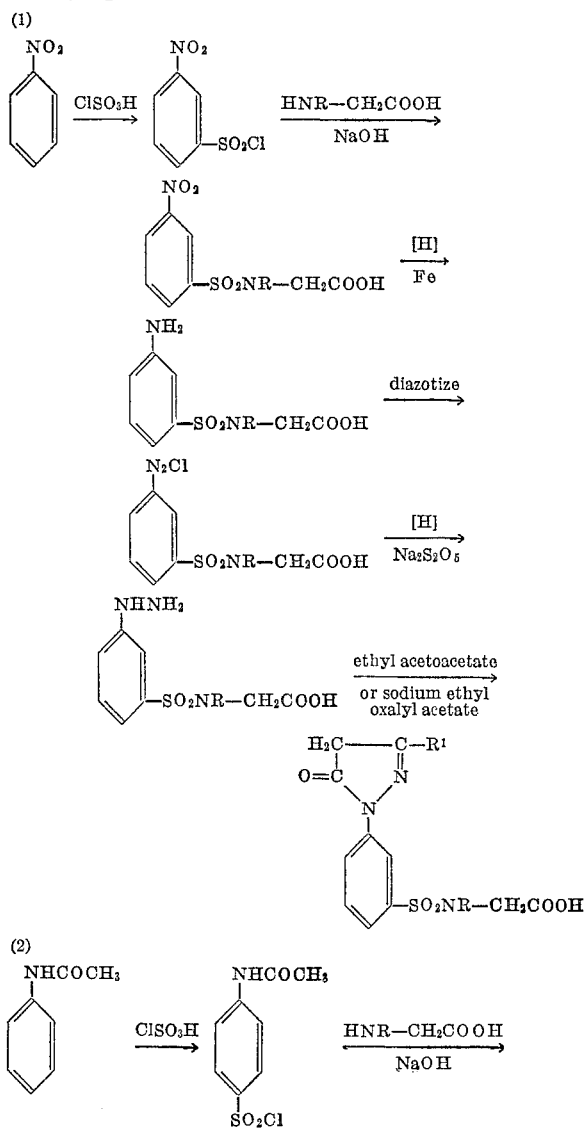

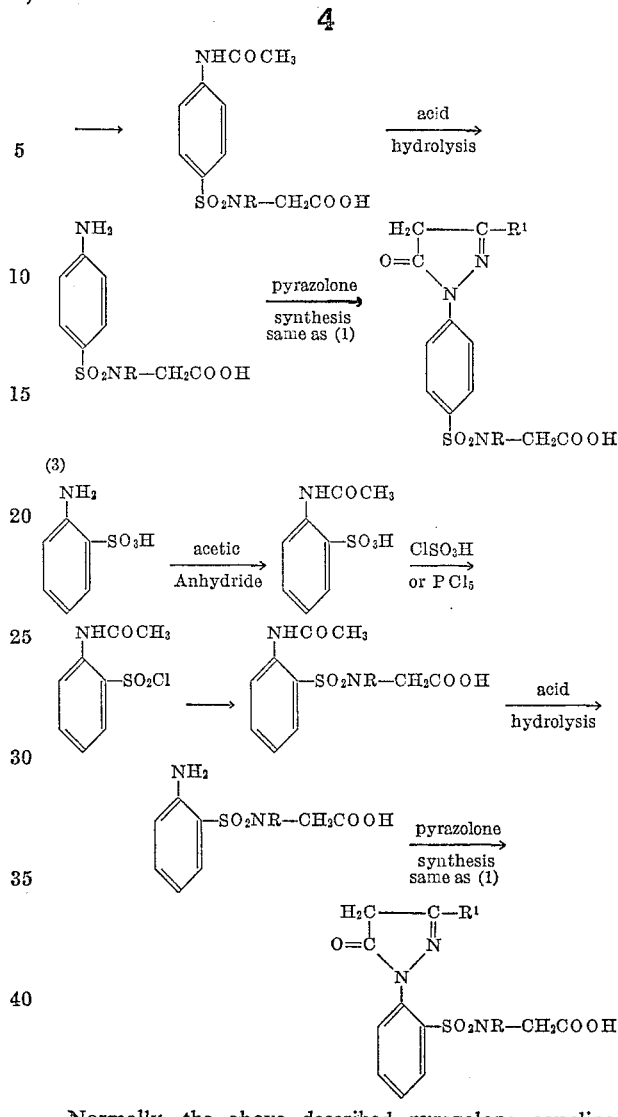

Normally, the above described pyrazolone coupling components are not isolated as they are usually too soluble in water to precipitate by salting out. Accordingly, an aqueous solution of the pyrazolone coupling component is employed in known manner for reaction with the diazo component, i.e. the diazotized form of the aromatic amine compound of the formula

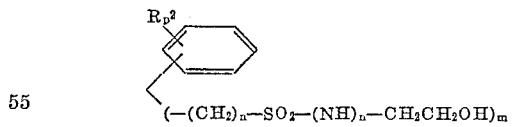

The sulfate ester of the resulting azo dyestuff is then produced in known manner by treatment with the known sulfating agents such as concentrated sulfuric acid at room temperature, chlorosulfonic acid and a tertiary amine such as pyridine, the complex compounds of $SO_3$ with a tertiary amine such as pyridine, etc.

Diazo components containing fiber-reactive groups wherein both $n$ terms are 1 may be prepared by reacting a nitrobenzylchloride with sodium bisulfate, to replace the chlorine atom by $-SO_3Na$, reacting the resulting intermediate with $PCl_5$ to replace the $-SO_3Na$ by $-SO_2Cl$, reacting the resulting intermediate with ethanolamine, and then reducing the nitro group to produce the corresponding diazotizable primary aromatic amine of Formula II above.

Diazo components wherein the lefthand $n$ is 0 and the righthand $n$ is 1 are correspondingly prepared by reacting a suitable nitrobenzenesulfochloride with ethanolamine and then reducing the nitro group as above.

The fiber-reactive dyestuffs of the present invention are highly effective for coloring natural and synthetic fibers, particularly cellulosic textile fibers, in any desired shades of good to excellent fastness properties. The coloring process involves dyeing (including printing) the fibrous material by application thereto under acid binding conditions of an aqueous medium containing at least one of the above-defined dyestuffs of the invention at any temperature ranging from ambient temperatures to the boiling point of the medium. The medium may have a pH ranging from about 4 to 14 although generally neutral to alkaline conditions are preferred. It will be understood that as employed herein, the term "aqueous medium" is intended to include preferred aqueous solutions in addition to dispersions or stable colloidal suspensions of the reactive dyestuff, properly thickened in known manner when employed in a printing process. The aqueous medium may be applied by immersion, jig dyeing, padding, spraying, printing, or in any other desired manner.

Although aqueous media are disclosed and claimed in the present process, it will be understood that this is only the preferred embodiment and that the water in the aqueous medium may be replaced in whole or in part by a water miscible, polar organic solvent such as acetone, alcohol, dioxazine, dimethylformamide, or the like without departing from the scope of this invention. It will be likewise understood that the medium containing the reactive dyestuffs of the present invention may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids and the like, buffering agents such as mixtures of monosodium and disodium or potassium phosphates or arylsulfonamides, and protective colloids and thickening agents for the production of printing pastes such as methyl cellulose, starch, gum arabic, gum tragacanth, locust bean gum, sodium alginate, and the like.

The reaction between the reactive dyestuff and the fiber containing a reactive hydrogen atom involves liberation of sulfuric acid and the reaction is accordingly favored by acid binding conditions. As acid binding agents which may be added to the medium containing the reactive dyestuff or applied to the fiber prior or subsequent thereto, there may be mentioned generally alkali metal (sodium, potassium, lithium, etc.) hydroxide, carbonate, bicarbonate, phosphate, silicate, borate, acetate or the like, or an organic base such as triethanolamine or other tertiary amines as disclosed for example in U.S. 3,116,103, in an amount sufficient to neutralize the liberated acid in whole or in part. Such amount may range from less than 0.5% up to 10% or more based on the weight of the aqueous medium containing the reactive dyestuff. Instead of the above mentioned acid binding agents, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 10 minutes or less to several hours or more. Usually, the fiber is continuously padded with the fiber-treating medium containing the chromophoric compound, squeezed to, for example a 50 to 200% liquor pickup, dried and heated at 90 to 350° C. for an hour or more to 30 seconds or less, followed by washing and rinsing. A dry heat treatment may be substituted by a steaming or the like if desired.

The dyeing process of this invention is particularly effective for dyeing and printing cellulosic fibers of natural or synthetic type such as cotton, linen, wood, paper, regenerated cellulose and the like in any desired shades of good to excellent fastness properties. As a result of the reactive dyeing process of the invention, such dyed or printed fibers are bonded and in some instances cross linked to the fiber-reactive dyestuffs of the invention through the depicted terminal —$SO_2$—$(NH)_n$—$CH_2CH_2$— groups with liberation of the terminal sulfato radicals from such groups and the reactive hydrogen atoms (for example in the OH groups in cellulose) in the fiber. As pointed out above, the cross linking reaction leading to enhanced fastness properties and the like is favored and/or accelerated by reaction of the described double substitution of the fiber-reactive groups in the same nucleus, particularly in the meta positions in the depicted benzene ring.

In addition to cellulose and its derivatives, the invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano or amide linear or side groups, polyvinyl alcohol, partially hydrolyzed cellulose acetate and polyvinyl acetate, polyvinyl chloride, and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention and are not to be regarded as limitative. All parts and proportions referred to herein and in the appended claims are by weight unless otherwise indicated.

Example 1

(a) The following azo dye is obtained by coupling diazotized 5-amino - 2 - methyl-m-xylene-a[1], $\alpha^3$-bis-(2-sulfonylethanol) with m-(3-methyl-5-oxo-2-pyrazolin-1-yl) benzene-sulfonamido-N,N-diacetic acid, forming the sulfate ester) by treatment with 96% sulfuric acid, and salting out the sulfate ester:

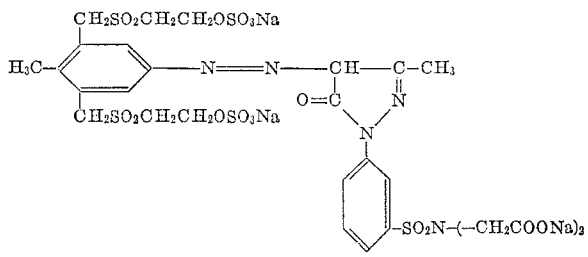

(b) An aqueous dyebath containing, per gallon, 3 oz. each of the above dyestuff and of sodium bicarbonate, and one oz. of urea is padded on cotton piece goods. The rubber roller of the padder is adjusted so that there is about 70% wet pickup of the dye solution. The padded cloth is air dried and then heat cured at 310° F. for three minutes. The goods are soaped at the boil for 5 minutes in the presence of a small amount of a nonionic detergent. A bright yellow shade is produced having excellent fastness properties. The reactivity with cotton is very well evidenced by the small loss of color upon soaping.

Example 2

(a) The following azo dye is obtained following the procedure of Example 1(a) using m-(3-methyl-5-oxo-2-pyrazolin-1-yl)benzenesulfonamido - N - methyl-N-acetic acid as the coupler:

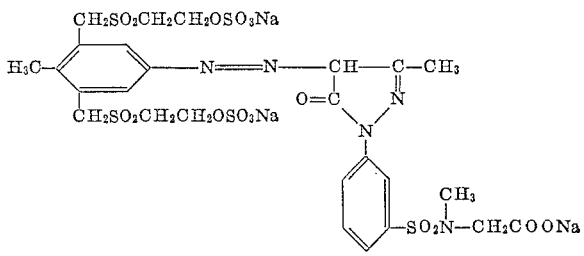

(b) 80/80 cotton print cloth is printed with a paste made with 3% of the above dyestuff, 10% urea, 35% water, 50% of 4% sodiumalginate solution, and 2% sodium bicarbonate.

One portion of the print is fixed by steaming for 10 minutes and another by heat curing at 300° F. for 3 minutes. The fixed prints are rinsed in cold water and then soaped at the boil for 5 minutes in the presence of a small amount of a nonionic detergent. The reactivity with cotton is excellent by both treatments and fast yellow shades are produced.

Example 3

(a) The following azo dye is obtained following the procedure of Example 1(a) using m-(3-methyl-5-oxo-2-pyrazolin-1-yl)benzenesulfonamido-N-acetic acid as the coupler:

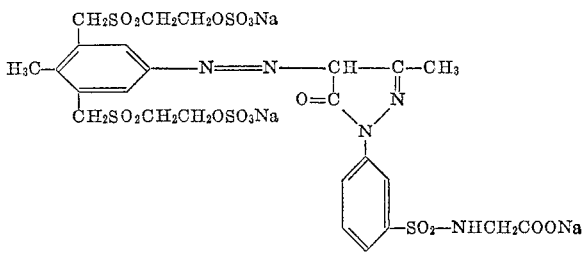

(b) Bright yellow shades are produced on cotton piece goods having excellent fastness properties when the above dye is applied as in Example 1(b).

Example 4

(a) The following azo dye is obtained following the procedure of Example 2(a) using 2-(p-aminophenylsulfonyl)-ethanol as diazo component:

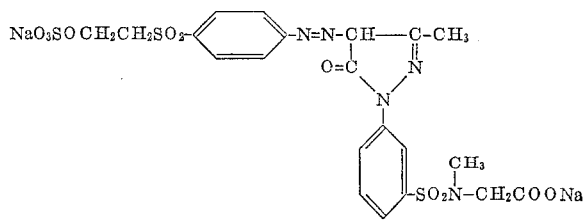

(b) Bright yellow shades of excellent wash fastness properties are produced when the above dye is applied as in Example 1(b).

Example 5

(a) The following azo dye is obtained following the procedure of Example 4(a) using m-(3-methyl-5-oxo-2-pyrazolin-1-yl)benzenesulfoamido-N,N-diacetic acid as coupler:

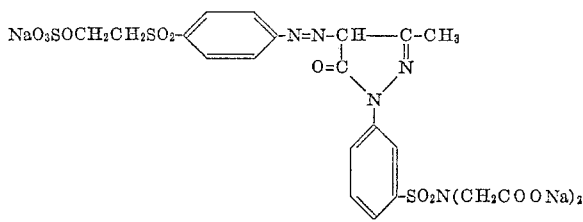

(b) Application as in Example 4(b) yields similar results.

Example 6

(a) The following azo dye is obtained by the procedure of Example 1(a) using p-chloroaniline-o-(N-hydroxyethyl)sulfonamide as diazo component and p-(3-methyl-5-oxo-2-pyrazolin-1-yl)benzene sulfonamido-N,N-diacetic acid as coupler:

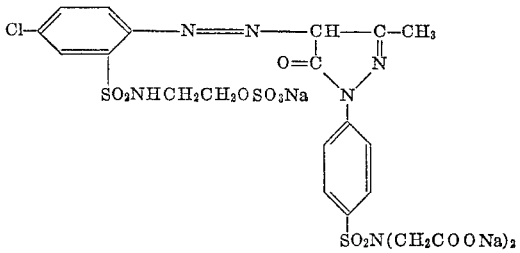

(b) Applicaion as in Example 1(b) yields similar results.

Example 7

(a) The following azo dye is obtained by the procedure of Example 1(a) using 2-methoxyaniline-5-(N-hydroxyethyl)methylene sulfonamide as diazo component and o-(3-methyl-5-oxo-2-pyrazolin-1-yl)benzene sulfonamido-N,N-diacetic acid as coupler:

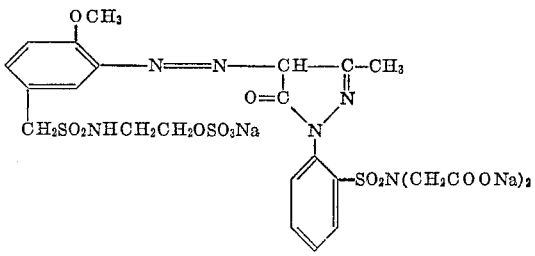

(b) Application as in Example 1(b) yields similar results.

This invention has been disclosed with respect to certain preferred embodiments, and there will become obvious to persons skilled in the art various modifications and variations thereof which are intended to be included within the spirit and purview of this invention and application and the scope of the appended claims.

We claim:

1. A dyestuff of the formula

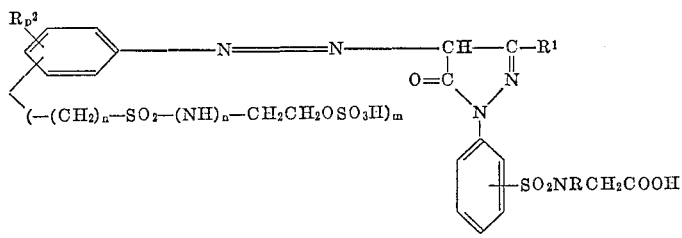

wherein

R is selected from the group consisting of H, lower alkyl, and —CH$_2$COOH;
R$^1$ is selected from the group consisting of lower alkyl and —COOH;
R$^2$ is selected from the group consisting of H, lower alkyl, lower alkoxy, and halogen;
$n$ has a value of 0 or 1;
$m$ is an integer of 1 to 2;
and
$p$ has a value of 0 to 2.

2. A dyestuff of the formula

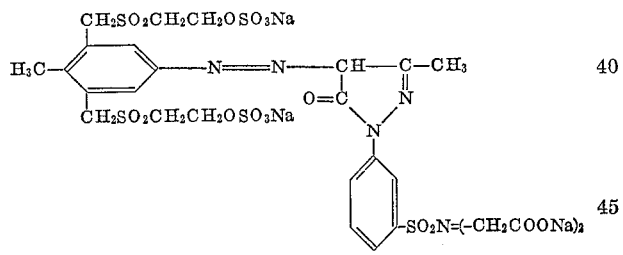

3. A dyestuff of the formula

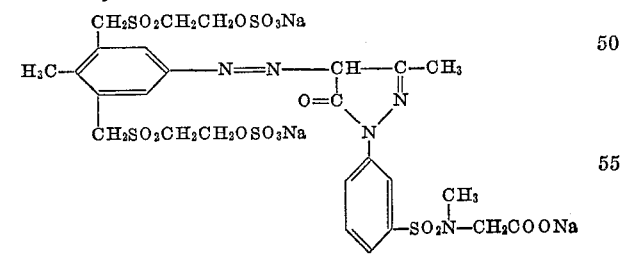

4. A dyestuff of the formula

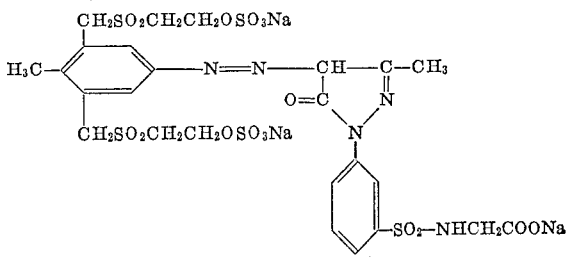

5. A dyestuff of the formula

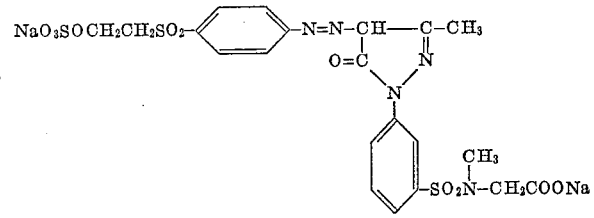

6. A dyestuff of the formula

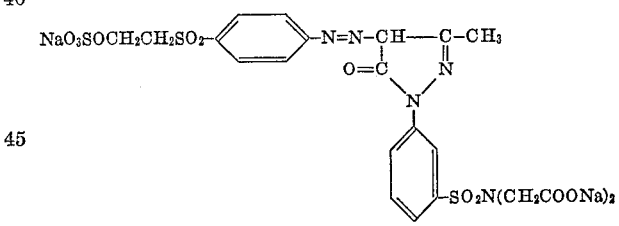

References Cited

UNITED STATES PATENTS 3,170,912   2/1965   Freyermuth et al. _____ 260—163

CHARLES B. PARKER, *Primary Examiner.*

D. PAPUGA, *Assistant Examiner.*

UNITED STATES PATENT OFFICE
CERTIFICATE OF CORRECTION

Patent No. 3,379,715　　　　　　　　　　　　　　　　　　　　　　　　April 23, 1968

Max E. Chiddix et al.

It is certified that error appears in the above identified patent and that said Letters Patent are hereby corrected as shown below:

Column 2, lines 16 to 28; column 4, lines 52 to 55 and column 9, lines 15 to 24, that portion of each of the formula reading

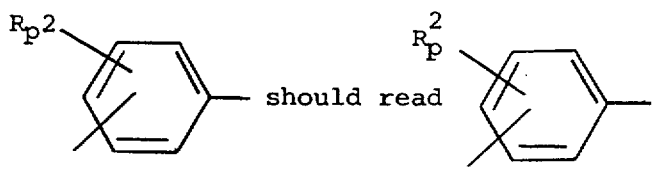 should read 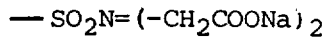

Column 7, lines 3 to 12, the lower right-hand portion of the formula should appear as shown below:

$$— SO_2N=(-CH_2COONa)_2$$

Signed and sealed this 10th day of March 1970.

(SEAL)
Attest:

EDWARD M. FLETCHER, JR.　　　　　　　　　　　　　　　　WILLIAM E. SCHUYLER, JR.
Attesting Officer　　　　　　　　　　　　　　　　　　　　Commissioner of Patents